US011265451B2

(12) United States Patent
Yang et al.

(10) Patent No.: US 11,265,451 B2
(45) Date of Patent: Mar. 1, 2022

(54) CAMERA MODULE AND MOBILE TERMINAL (71) Applicant: GUANGDONG OPPO MOBILE TELECOMMUNICATIONS CORP., LTD., Guangdong (CN)

(72) Inventors: Zimei Yang, Guangdong (CN); Maozhao Huang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 46 days.

(21) Appl. No.: 16/983,609

(22) Filed: Aug. 3, 2020

(65) Prior Publication Data
US 2020/0366822 A1 Nov. 19, 2020

Related U.S. Application Data (63) Continuation of application No. PCT/CN2019/088755, filed on May 28, 2019.

(30) Foreign Application Priority Data

May 31, 2018 (CN) .......................... 201820832535.9

(51) Int. Cl.
*H04N 5/225* (2006.01)
*H04M 1/02* (2006.01)
*H01R 12/79* (2011.01)

(52) U.S. Cl.
CPC ........ *H04N 5/2257* (2013.01); *H04M 1/0264* (2013.01); *H04N 5/2252* (2013.01); *H04N 5/2253* (2013.01); *H01R 12/79* (2013.01)

(58) Field of Classification Search
CPC .. H04N 5/2257; H04N 5/2258; H04M 1/0264
(Continued)

(56) References Cited

U.S. PATENT DOCUMENTS 6,101,339 A 8/2000 Miki et al.
7,957,765 B1 6/2011 Causey et al.
(Continued)

FOREIGN PATENT DOCUMENTS

CN 202210818 U 5/2012
CN 104378463 A 2/2015
(Continued)

OTHER PUBLICATIONS

Indian Examination Report for IN Application 202017037111 dated Aug. 4, 2021. (6 pages).
(Continued)

*Primary Examiner* — Anthony J Daniels
(74) *Attorney, Agent, or Firm* — Young Basile Hanlon & MacFarlane, P.C.

(57) ABSTRACT

Disclosed is a camera module capable of being detachably arranged on and operating with a host of a mobile terminal cooperatively and used in combination with the host. The camera module comprising a main board, a battery, a capturing assembly, and a housing. The main board defines a first mounting hole. The battery is stacked on the main board. The battery defines a second mounting hole corresponding to the first mounting hole. The capturing assembly includes a bracket and a camera. The camera is installed on the bracket, and the bracket is contained in a space defined by both the first and the second mounting holes. The camera is arranged through the first mounting hole. The incident surface of the camera is protruded out of the first mounting hole. The housing is arranged on the main board and the battery.

20 Claims, 7 Drawing Sheets (58) Field of Classification Search
USPC .......................................................... 348/374
See application file for complete search history.

(56) References Cited

U.S. PATENT DOCUMENTS

| | | | | |
|---|---|---|---|---|
| 2015/0156898 A1* | 6/2015 | Shin | ................... | H04M 1/0256 361/679.02 |
| 2015/0355525 A1* | 12/2015 | Abrams | .............. | F21V 33/0052 348/207.11 |
| 2018/0267390 A1* | 9/2018 | Kim | ....................... | G03B 17/55 |

FOREIGN PATENT DOCUMENTS

| | | | |
|---|---|---|---|
| CN | 204652519 U | | 9/2015 |
| CN | 205265795 U | | 5/2016 |
| CN | 206099257 U | | 4/2017 |
| CN | 107454230 A | | 12/2017 |
| CN | 107666526 A | * | 2/2018 |
| CN | 107666526 A | | 2/2018 |
| CN | 208489912 U | | 2/2019 |

OTHER PUBLICATIONS

International Search Report issued in corresponding application No. PCT/CN2019/088755 dated Aug. 19, 2019.
Extended European Search Report for EP Application 19809974.9 dated Feb. 11, 2021. (6 pages).

* cited by examiner

CAMERA MODULE AND MOBILE TERMINAL

CROSS-REFERENCE TO RELATED APPLICATION(S)

The present application is a continuation application of International (PCT) Patent Application No. PCT/CN2019/088755, filed on May 28, 2019, which claims priority to Chinese Patent Application No. 201820832535.9, filed on May 31, 2018, the entire contents of both of which are hereby incorporated by reference in their entireties.

TECHNICAL FIELD

The present disclosure relates to the technical field of mobile terminals, and in particular to a camera module and a mobile terminal.

BACKGROUND

In mobile terminals such as mobile phones, the front camera occupies part of the space of the display screen, and the space for increasing the screen ratio of the mobile phone is limited, affecting the realization of full-screen mobile phones.

SUMMARY

The present disclosure provides a camera module, capable of being detachably installed on a host of the mobile terminal and operating with the host cooperatively. The camera module includes: a main board, defining a first mounting hole; a battery stacked on the main board and defining a second mounting hole corresponding to the first mounting hole; a capturing assembly including a bracket and a camera, wherein the camera is installed on the bracket, the bracket is contained in a space defined by both the first mounting hole and second mounting hole, the camera is disposed through the first mounting hole, and a light incident surface of the camera is exposed out of the first mounting hole; and a housing sleeved on the main board and the battery.

In another embodiment, the present disclosure provides a camera module, including: a main board including a contacting surface and a connecting surface arranged opposite to the contacting surface, wherein the main board defines a first mounting hole penetrating the contacting surface and the connecting surface; a battery stacked on the contacting surface and defining a second mounting hole communicating with the first mounting hole; a capturing assembly including a camera, wherein a part of the capturing assembly is disposed through the first mounting hole and second mounting hole, and an ambient light on a side of the connecting surface is capable of entering into the camera; and a housing sleeved on the main board and the battery.

In another embodiment, the present disclosure provides a mobile terminal including a host and a camera module, wherein the camera module is capable of being installed on and detached from the host, and wirelessly connected with the host after being detached; the camera module includes: a main board including a contacting surface and a connecting surface arranged opposite to the contacting surface, wherein a first mounting hole penetrating the contacting surface and the connecting surface is defined on the main board; a battery stacked on the contacting surface and defining a second mounting hole communicating with the first mounting hole; a capturing assembly including a camera, wherein a part of the capturing assembly is disposed through the first mounting hole and second mounting hole, and an ambient light on a side of the connecting surface is capable of entering into the camera; and a housing sleeved on the main board and the battery.

BRIEF DESCRIPTION OF DRAWINGS

To further illustrate technical solutions of embodiments of the present disclosure or the technical solutions in the prior art, drawings needed for description of the embodiments will be briefly introduced. Obviously, the following drawings are only some embodiments of the present disclosure. To any one of skill in the art, other drawings may be obtained without any creative work based on the following drawings.

DETAILED DESCRIPTION

To make any one of skill in the art to understand the technical solutions of the present disclosure, the present disclosure will be described in detail with reference to the accompanying drawings. The drawings show preferred embodiments of the present disclosure. However, the present disclosure may be implemented in many different forms and is not limited to the embodiments described herein. The embodiments are to provide a thorough and comprehensive understanding of the present disclosure.

A terminal device in the present disclosure refers to a device capable of receiving and/or transmitting communication signals via any one or more of the connection methods including and not limited to:

(1) connection via wired lines, such as a public switched telephone network (PSTN), a digital subscriber line (DSL), a digital cable, and a direct cable connection;

(2) connection via wireless interface, such as a cellular network, a wireless local area network (WLAN), a digital television network such as a DVB-H network, a satellite network, and an AM-FM broadcast transmitter.

The terminal device configured to communicate through a wireless interface may be referred to as a "mobile terminal". The mobile terminals may include and are not limited to:

(1) a satellite phone or a cellular phone;

(2) a personal communications system (PCS) terminal capable of combining a cellular radiotelephone with data processing, facsimile, and data communication capabilities;

(3) a radiotelephone, a pager, an Internet/Intranet access, a Web browser, a memo pad, a calendar, a personal digital assistant (PDA) equipped with a global positioning system (GPS) receiver;

(4) a conventional laptop and/or palmtop receiver;

(5) a conventional laptop and/or palmtop radio telephone transceiver, etc.

The present disclosure provides a camera module detachably arranged on a host of a mobile terminal, including: a main board, defining a first mounting hole; a battery stacked on the main board and defining a second mounting hole corresponding to the first mounting hole; a capturing assembly including a bracket and a camera, wherein the camera is installed on the bracket, the bracket is contained in a space defined by both the first mounting hole and second mounting hole, the camera is disposed through the first mounting hole, and a light incident surface of the camera is exposed out of the first mounting hole; and a housing sleeved on the main board and the battery.

In some embodiments, the main board has a connecting surface arranged opposite to the battery, a first board to board (BTB) connector is arranged on the connecting surface; the capturing assembly further includes a first flexible printed circuit (FPC) board arranged on the bracket and connected to the camera, the first FPC board has a mounting end, a part of the first FPC board is stacked between the main board and the battery, the mounting end is bent to the connecting surface, and a first BTB socket capable of being paired with the first BTB connector is arranged on the mounting end.

In some embodiments, a part of the connecting surface is recessed toward the battery to form a sink, and the first BTB connector is arranged on a bottom wall of the sink.

In some embodiments, the camera module further includes an antenna spring sheet, the antenna spring sheet being arranged on the connecting surface.

In some embodiments, the main board has a contacting surface arranged toward the battery, a second BTB connector is arranged on the contacting surface, a second FPC board is connected to the battery, a second BTB socket is arranged on the second FPC board, and the second BTB socket is capable of being paired with the second BTB connector.

In some embodiments, a surface of the housing defines a third mounting hole configured for the camera to be disposed through, and a distance between the light incident surface of the camera and the surface of the housing is A, where 0 mm≤A≤5 mm.

In some embodiments, the camera module further includes a connecting plug configured to transmit current and data, the connecting plug being connected to the main board and capable of being inserted in the host.

In some embodiments, the connecting plug is rotatably connected to the main board, a clearance gap is defined on the housing, the connecting plug is arranged passing through the clearance gap, and the clearance gap provides a rotation space for the connecting plug.

The present disclosure provides a camera module detachably arranged on a host of a mobile terminal and operating with the host cooperatively, including: a main board, defining on the main board; a battery stacked on the main board, wherein the battery has a stacking surface capable of being stacked on the main board, and defines a second mounting hole on the stacking surface corresponding to the first mounting hole; a capturing assembly comprising a bracket and a camera, wherein the camera is installed on the bracket, the bracket is contained in a space defined by both the first mounting hole and second mounting hole, and a light incident surface of the camera is arranged on a same side where the stacking surface is arranged; and a housing sleeved on the main board and the battery.

In some embodiments, the battery has a stacking surface stacked on the main board, and the second mounting hole is defined on the stacking surface; the light incident surface of the camera is arranged on a same side where the stacking surface is arranged.

In some embodiments, a contour of the battery has a rectangular shape, and a contour of the second mounting hole has a rectangular shape; a circumferential direction of the second mounting hole is closed; the contour of the second mounting hole is contained in the contour of the battery.

In some embodiments, a notch communicating with the second mounting hole is defined on the battery along a circumference of the second mounting hole.

In some embodiments, the main board has a connecting surface arranged opposite to the battery, a first board to board (BTB) connector is arranged on the connecting surface; the capturing assembly further includes a first flexible printed circuit (FPC) board arranged on the bracket and connected to the camera, the first FPC board has a mounting end, a part of the first FPC board is stacked on a surface of the battery away from the main board, the mounting end is bent to the connecting surface, and a first BTB socket capable of being paired with the first BTB connector is arranged on the mounting end.

The present disclosure provides a mobile terminal including a host and the camera module as described before, wherein the camera module is wired or wirelessly connected with the host.

The present disclosure provides a camera module including: a main board including a contacting surface and a connecting surface arranged opposite to the contacting surface, wherein the main board defines a first mounting hole penetrating the contacting surface and the connecting surface; a battery stacked on the contacting surface and defining a second mounting hole communicating with the first mounting hole; a capturing assembly including a camera, wherein a part of the capturing assembly is disposed through the first mounting hole and second mounting hole, and an ambient light on a side of the connecting surface is capable of entering into the camera; and a housing sleeved on the main board and the battery.

In some embodiments, the capturing assembly includes a bracket, the camera is arranged on the bracket, and the bracket is arranged passing through the first mounting hole and the second mounting hole.

In some embodiments, the capturing assembly includes a first flexible printed circuit (FPC) board arranged on the bracket and connected to the camera, the first FPC board is bent from a side where the battery is arranged to a side where the connecting surface is arranged; one of the side where the connecting surface of the main board is arranged, and an end of the first FPC board away from the camera is arranged with a first board to board (BTB) connector; the other one of the side where the connecting surface of the main board is arranged, and an end of the first FPC board away from the camera is arranged with a first BTB socket; the first BTB socket is capable of being paired with the BTB connector.

In some embodiments, the battery includes a stacking surface stacked on the main board; a part of the contacting surface is recessed along a direction away from the battery or a part of the stacking surface is recessed along a direction away from the main board to form a recess, and a part of the first FPC board is received in the recess.

In some embodiments, a sink passing through a margin of the connecting surface is defined on the connecting surface, the first BTB connector and the first BTB socket paired to each other are received in the sink.

In some embodiments, a second FPC board is connected to the battery; one of an end of the second FPC board away from the battery and the main board is arranged with a second BTB connector; the other one of the end of the second FPC board away from the battery and the main board is arranged with a second BTB socket; the second BTB socket is capable of being paired with the second BTB connector.

In some embodiments, a surface of the housing defines a third mounting hole configured for the camera to be disposed through, a side of the camera for the light entering is protruded from the housing, or the side of the camera for the light entering is flush with the surface of the housing.

In some embodiments, the camera module includes a connecting terminal connected to the main board, and the connecting terminal is configured to be inserted in a host, to transmit a current or a data between the camera module and the host.

In some embodiments, the connecting terminal is a micro USB plug, or a micro USB socket, or a type-c plug, or a type-c socket.

In some embodiments, the connecting terminal is rotatably connected to the main board, a clearance gap is defined on the housing, and the connecting terminal is arranged passing through the clearance gap.

The present disclosure provides a mobile terminal, including a host and a camera module, wherein the camera module is capable of being installed on and detached from the host, and wirelessly connected with the host after being detached; the camera module includes: a main board including a contacting surface and a connecting surface arranged opposite to the contacting surface, wherein a first mounting hole penetrating the contacting surface and the connecting surface is defined on the main board; a battery stacked on the contacting surface and defining a second mounting hole communicating with the first mounting hole; a capturing assembly including a camera, wherein a part of the capturing assembly is disposed through the first mounting hole and second mounting hole, and an ambient light on a side of the connecting surface is capable of entering into the camera; and a housing sleeved on the main board and the battery.

Figure 1:
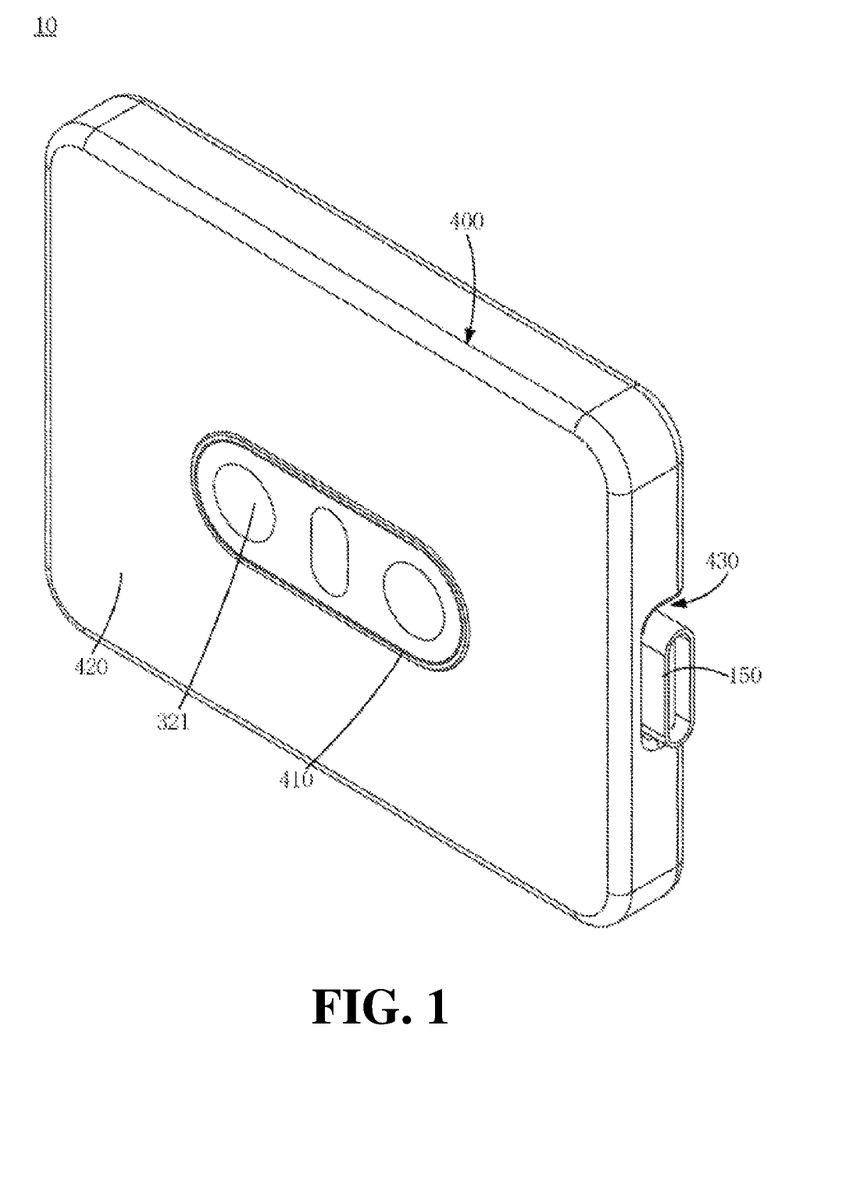
FIG. 1 is a perspective view of a camera module according to an embodiment of the present disclosure.
Figure 9:
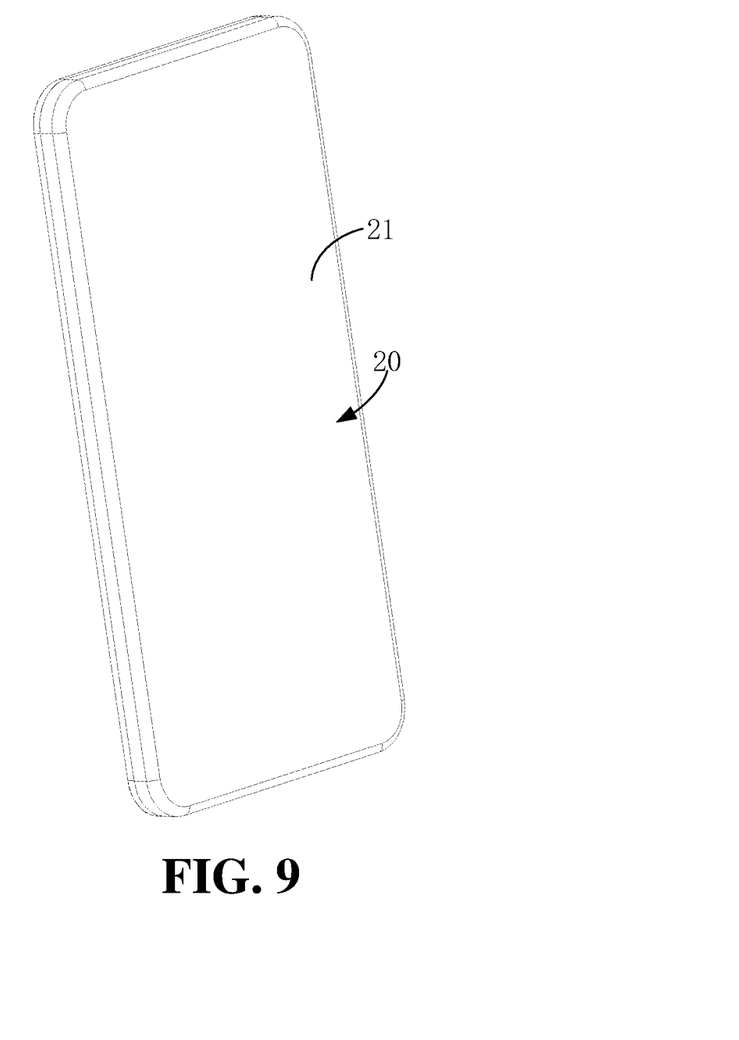
FIG. 9 is a perspective view of a host according to an embodiment of the present disclosure.

Referring to FIG. 1 and FIG. 9, the present disclosure provides a camera module 10 according to an embodiment. The camera module 10 is detachably arranged on a host 20 of a mobile terminal. The camera module 10 and the host 20 of the mobile terminal may operate cooperatively. The mobile terminal may be a smart phone or a tablet, etc. When the camera module 10 is installed (for example, inserted) on the host 20, the host 20 may control a shooting function of the camera module 10 through a wired connection. The camera module 10 does not occupy an installation space of a display 21 on the host 20. In the case that the shooting function is performed and an overall size of the host 20 is constant, an area of the display 21 could be increased. In such a way, the ratio of the area of the display 21 to the area of the host 20 could be increased, that is, a screen ratio of the host 20 could be increased and the screen ratio of the mobile terminal could be increased. When the camera module 10 is detached from the host 20, the host 20 may control the shooting function of the camera module 10 through a wireless connection. Therefore, in a state of the camera module 10 being installed on the host 20 or separated from the host 20, the camera module 10 does not occupy the installation space of the display 21 on the host 20, and the screen ratio of the mobile terminal could be increased by increasing the area of the display 21.

Figure 2:
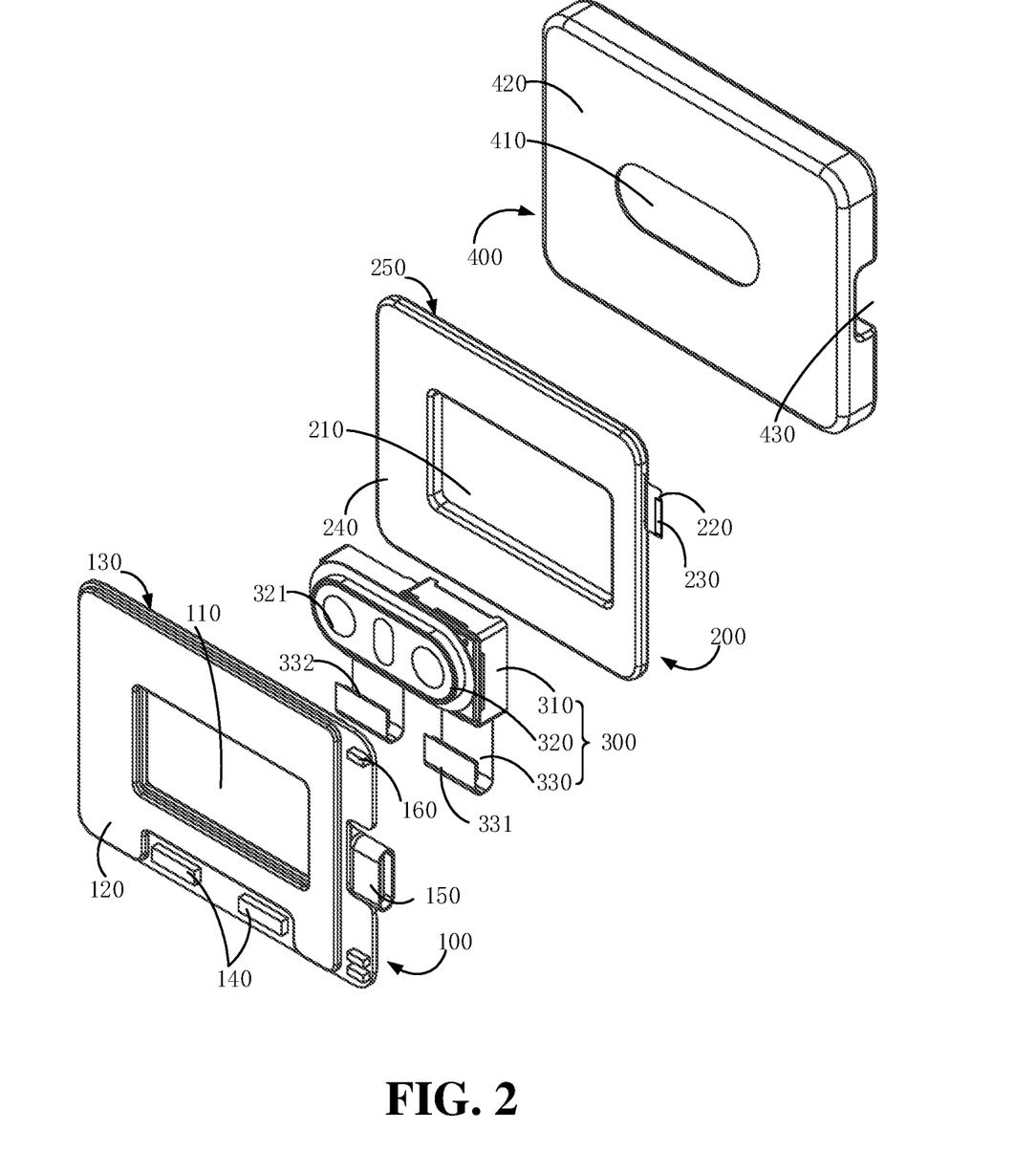
FIG. 2 is an exploded view of FIG. 1.
Figure 3:
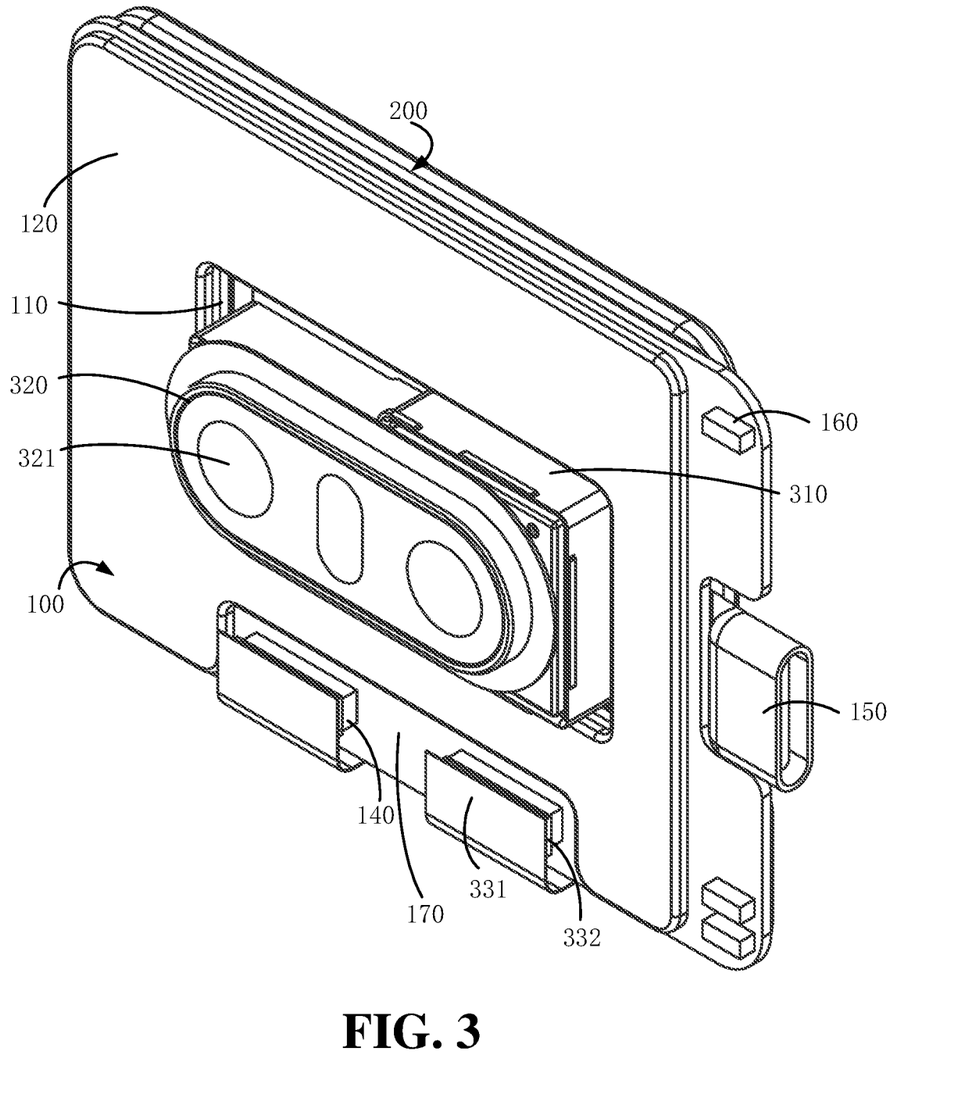
FIG. 3 is a schematic view of a partial structure in FIG. 1 after a housing is removed.

Referring to FIG. 1 to FIG. 3, the camera module 10 includes a main board 100, a battery 200, a capturing assembly 300, and a housing 400. A first mounting hole 110 is defined on the main board 100. The battery 200 is stacked on the main board 100. The battery 200 is electrically connected to the main board 100 and supplies power to the main board 100. A second mounting hole 210 is defined on the battery 200, corresponding to the first mounting hole 110. The second mounting 210 may communicate with the first mounting hole 110. The capturing assembly 300 includes a bracket 310 and a camera 320 arranged on the bracket 310. An amount of the cameras 320 may be one, two or more. The bracket 310 is electrically connected to the main board 100, such that the camera 320 transmits data to other components arranged on the main board 100 through the bracket 310. The bracket 310 may be completely contained in a space defined by both the first mounting hole 110 and the second mounting hole 210. The camera 320 may be disposed through the first mounting hole 110 of the main board 100. A light incident surface 321 of the camera 320 may be arranged back to the battery 200. The housing 400 may be sleeved on the main board 100 and the battery 200, protecting the main board 100 and the battery 200. The housing 400 may protect the main board 100 and the battery 200 from being corroded by an adherence of liquid droplets and dust and from being damaged by an external impact, which could ensure that the camera module 10 has a sufficiently long service life.

The battery 200 is stacked on the main board 100. The bracket 310 is contained in the space defined by both the first mounting hole 110 and the second mounting hole 210. The camera 320 is disposed through the first mounting hole 110. In such a way, the bracket 310 and the camera 320 occupy the space defined by the first mounting hole 110 and the second mounting hole 210, that is, most or even all of the capturing assembly 300 is received in the first mounting hole 110 and the second mounting hole 210. Compared with directly adhering the capturing assembly 300 on a surface of the main board 100, in a case where a thickness of the battery 200 and that of the main board 100 are constant, a part of the capturing assembly 300, which is received in the first mounting hole 110 and the second mounting hole 210, does not occupy the thickness dimension of the camera module 10. In such a way, a thickness of a part of the capturing assembly 300 that is protruded out of the main board 100 and the surface of the battery 200 along a thickness direction of the camera module 10 could be reduced or even eliminated, thereby reducing the thickness dimension of the camera module 10. Since the first mounting hole 110 and the second mounting hole 210 are defined, a weight of the main board 100 and the battery 200 could be reduced, and a data processing function of the motherboard 100 and a capacity of the battery 200 may not be affected. In such a way, the camera module 10 with a thin and light design may be achieved.

The main board 100 may be a substantially rectangular board. The main board 100 has a contacting surface 130 and a connecting surface 120. The contacting surface 130 and the connecting surface 120 are arranged opposite to each other. The contacting surface 130 is arranged toward the battery 200, whereas the connecting surface 120 is arranged back to the battery 200. When the battery 200 is stacked on the main board 100, the battery 200 is stacked on the contacting surface 130 of the main board 100, and the contacting surface 130 is thus arranged closer to the battery 200 than the connection surface 120. The connecting surface 120 is arranged with a first board to board (BTB) connector 140. The first BTB connector 140 is a male connector. The first BTB connector 140 may also be replaced by a BTB connector that is a female connector.

The capturing assembly 300 further includes a first flexible printed circuit (FPC) board 330. The amount of the first FPC boards 330 may be two. An end of each first FPC board 330 is connected to the bracket 310. The other end of the first FPC board 330 is a mounting end 331. A first BTB socket 332 is arranged on the mounting end 331. The first BTB socket 332 is a female connector. The first BTB socket 332 may also be replaced by a BTB connector that is a male BTB connector.

Referring to FIG. 2 and FIG. 3, the battery 200 has a stacking surface 240 corresponding to the main board 100. The stacking surface 240 may be stacked on the main board 100. The battery 200 has a surface 250 opposite to the stacking surface 250. The second mounting hole 210 is defined on a surface of the stacking surface 240. The light incident surface 321 of the camera 320 is arranged on a same side where the stacking surface 240 is arranged. Therefore, the light incident surface 321 of the camera 320 is not arranged in the second mounting hole 210 of the battery 200 and is not arranged on a side where the surface 250 is arranged. That is, the light incident surface 321 of the camera 320 may be arranged in the first mounting hole 110 of the main board 100; or the light incident surface 321 of the camera 320 may be arranged protruding out of the first mounting hole 110, such that a configured distance between the light incident surface 321 and the connecting surface 120 of the main board 100 may be maintained.

Referring to FIG. 1 to FIG. 3, when the bracket 310 is contained in the space defined by both the first mounting hole 110 and the second mounting hole 210, and the camera 320 is disposed through the first mounting hole 110, a part of the first FPC board 330 near the bracket 310 is stacked between the main board 100 and the battery 200. Because the thickness of the first FPC board 330 is small, the dimension of the part of the first FPC board 330 in the thickness direction of the camera module 10 may be ignored. In other embodiments, a recess may be defined on the main board 100 and/or the battery 200, and the part of the first FPC board 330 may be received in the recess. In such a way, the dimension of the part of the first FPC board 330 in the thickness direction of the camera module 10 may be eliminated. The mounting end 331 of the first FPC board 330 is bent, relative to other parts of the first FPC board 330, to the connecting surface 120 of the main board 100 to achieve a covering effect on a margin of the main board 100. When the mounting end 331 is bent to the connecting surface 120, the first BTB socket 332 on the mounting end 331 may be paired with the first BTB connector 140 on the connection surface 120, such that the main board 100 may be electrically connected to the capturing assembly 300, and a fixation of the capturing assembly 300 may be strengthened. In other embodiments, a part of the first FPC board 330 near the bracket 310 may be stacked on the battery 200 only (that is, on the surface 250). When the mounting end 331 of the first FPC board 330 is bent, relative to other parts of the first FPC board 330, to the connecting surface 120 of the main board 100, the first FPC board 330 covers the margins of the main board 100 and the battery 200 simultaneously.

When the first BTB connector 140 is paired with the first BTB socket 332, in order to reduce a protruding distance of the mounting end 331 out of the connecting surface 120 in the thickness direction of the camera module 10, a part of the connecting surface 120 arranged with the first BTB connector 140 may be recessed along a direction toward the battery 200 (that is, toward the contacting surface 130) with a configured depth to form a sinker 170. The first BTB connector 140 may be arranged on a bottom wall of the sinker 170. Therefore, the mounting end 331 may be received in the sinker 170, thereby reducing or eliminating the distance of the mounting end 331 protruding out of the connecting surface 120, and ensuring the camera module 10 to be thinner.

A second BTB connector may be arranged on the contacting surface 130 of the main board 100. The second BTB connector may be a male connector. The second BTB connector may also be replaced by a BTB connector that is a female connector. In other embodiments, the second BTB connector may also be arranged on the connecting surface 120 of the main board 100. The battery 200 is arranged with a second FPC board 220, an end of the second FPC board 220 connected to the battery 200, and a second BTB socket 230 arranged on another end of the second FPC board 220. The second BTB socket 230 is a female BTB connector, and may also be replaced by a male BTB connector. When the battery 200 is stacked on the main board 100, the second BTB connector may be paired with the second BTB socket 230, such that the main board 100 may be electrically connected to the battery 200, and the battery 200 may supply power to the main board 100.

In some embodiments, the battery 200 may have a substantially rectangular structure, and the second mounting hole 210 defined on the battery 200 may be a rectangular through hole. A circumferential direction of the second mounting hole 210 is closed. An external contour of the battery 200 may be a first square and that of the second mounting hole 210 may be a second square. The second square may be contained inside the first square. In other embodiments, the circumferential direction of the second mounting hole 210 is non-closed, that is, a notch is defined on the battery 200 along a circumference of the second mounting hole 210. Along a cross-sectional direction, the battery 200 may have an "L" shape or a crescent shape. The notch is defined on the battery 200 along the circumference of the second mounting hole 210, such that the weight of the battery 200 may be reduced and the total weight of the camera module 10 may be reduced, on the basis of ensuring a reasonable battery life of the battery 200. In other embodiments, the second mounting hole 210 may be a blind hole.

Referring to FIG. 1, FIG. 2, and FIG. 6 to FIG. 8, a third mounting hole 410 is defined on a surface 420 of the housing 400. The camera 320 of the capturing assembly 300 may be inserted through both the first mounting hole 110 and the third mounting hole 410. The distance between the light incident surface 321 of the camera 320 and the surface 420 of the housing 400 is A, where a value of A may range from 0 mm≤A≤5 mm. Specifically, when the value of A is 0, the light incident surface 321 of the camera 320 may be flush with the surface 420 of the housing 400. When the value of A is greater than 0, for example, the value of A is 3 mm or 5 mm, etc., the camera 320 protrudes a reasonable distance out of the surface 420 of the housing 400. That is, the light incident surface 321 of the camera 320 protrudes a reasonable distance out of the surface 420 of the housing 400. On the basis of a focal length of the camera 320 satisfying the shooting function, the value of A may be reduced as much as possible, limiting a sudden visual effect of the camera 320 due to the protrusion, and ensuring an overall consistency of an appearance of the camera module 10.

Referring to FIG. 1 to FIG. 3, the camera module 10 further includes a connecting plug 150. The connecting plug 150 may be a micro USB plug or a type-c plug. The connecting plug 150 is connected to the main board 100. In other embodiments, the connecting plug 150 may be replaced with a connecting socket. The connecting plug 150 may be inserted in the host 20 of the mobile terminal. The camera module 10 may exchange data with the host 20 through the connecting plug 150, that is, the host 20 may control the shooting function of the camera module 10 through a wired connection. The host 20 may also supply power to the camera module 10 through the connecting plug 150.

Referring to FIG. 2, FIG. 4, FIG. 5 and FIG. 9, the connecting plug 150 may be rotatably connected to the main board 100. For example, the connecting plug 150 rotates around an axis extending in a width direction of the camera module 10. When the camera module 10 is inserted in the host 20, the connecting plug 150 may be "straightened" and unfolded, that is, the connection plug 150 may be arranged in parallel with the battery 200. When the camera module 10 is uninstalled from the host 20, the connecting plug 150 may be "bent" and retracted, that is, the connecting plug 150 may be rotated 90° relative to the host 20. The connecting plug 150 is thus substantially perpendicular to the battery 200. In a non-shooting state, the camera module 10 may be stored conveniently. In a shooting state, the connecting plug 150 could be rotated relative to the main board 100, to expand a shooting angle of the camera 320, such that the camera 320 could capture more shooting scenes.

Figure 4:
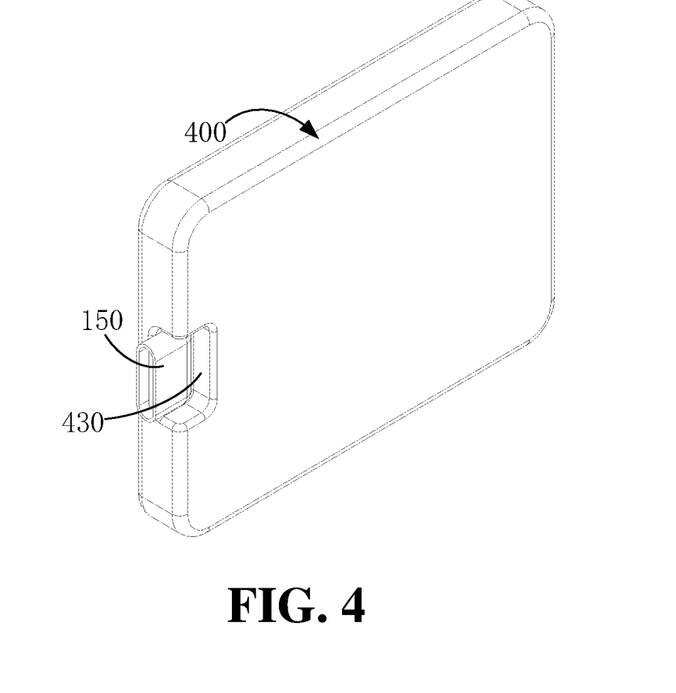
FIG. 4 is a schematic view of the camera module of FIG. 1 when a connecting plug is rotated to a certain position.
Figure 5:
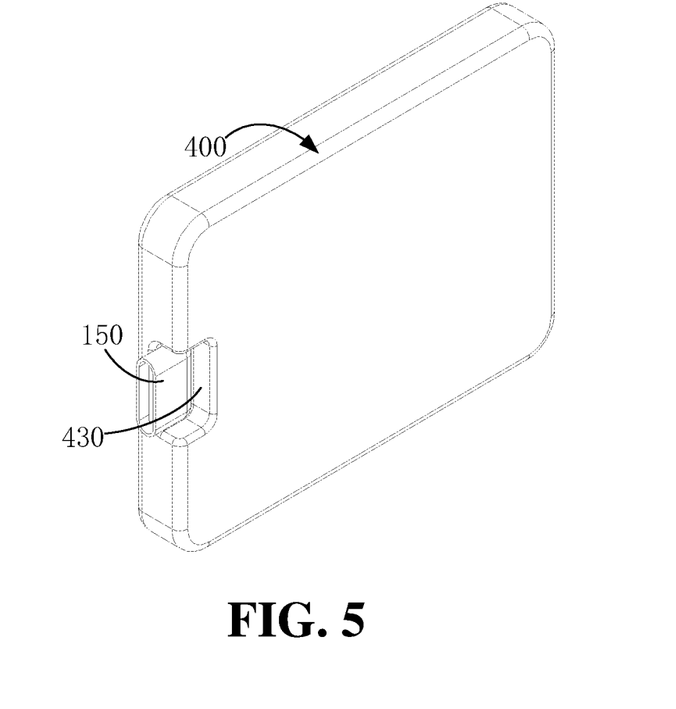
FIG. 5 is a schematic view of the camera module of FIG. 1 when the connecting plug is rotated to another position.
Figure 6:
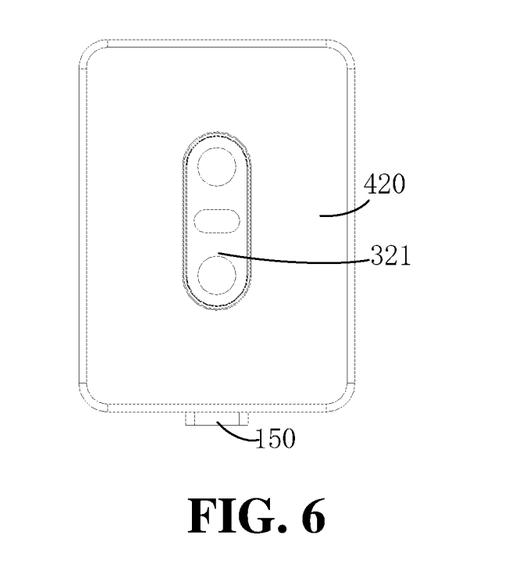
FIG. 6 is a schematic front view of FIG. 1.
Figure 7:
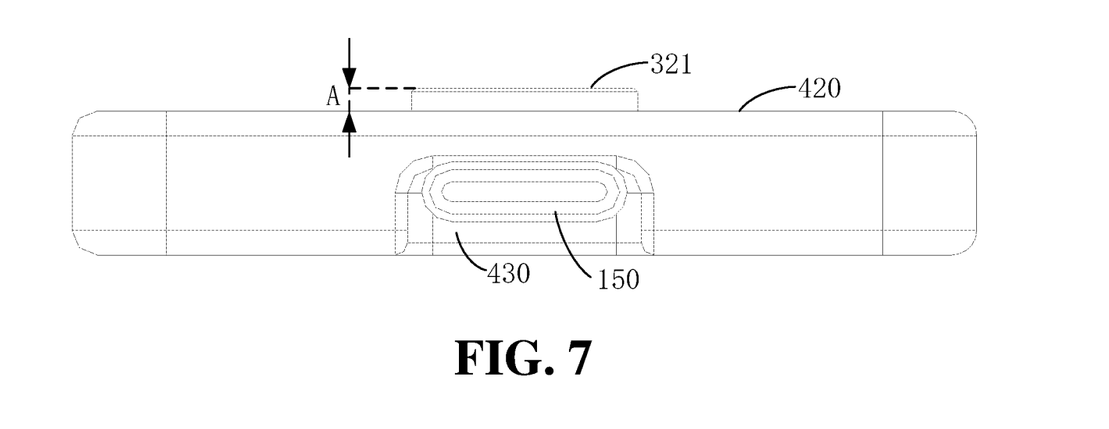
FIG. 7 is a schematic bottom view of FIG. 6.
Figure 8:
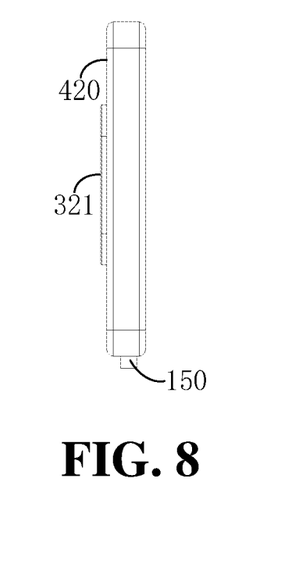
FIG. 8 is a schematic side view of FIG. 6.

Referring to FIG. 4 and FIG. 5, a clearance gap 430 is defined on the surface of the housing 400. The connecting plug 150 may be arranged passing through the clearance gap 430. When the connecting plug 150 rotates, the clearance gap 430 provides a sufficient rotation space for the connection plug 150, such that the connection plug 150 may not be jammed due to interference during the rotation.

Referring to FIG. 2, the camera module 10 further includes an antenna spring 160. The antenna spring 160 is arranged on the connecting surface 120 of the main board 100. For example, the antenna shrapnel 160 may receive and send Wi-Fi signals. When the camera module 10 is removed from the host 20, a wireless connection between the camera module 10 and the host 20 may be achieved through the antenna spring 160. Within a receiving range of the Wi-Fi signals, the camera module 10 may be controlled remotely through the mobile phone to take pictures. The camera module 10 may be placed in different positions, and finally a multi-scene shooting or a multi-angle shooting may be realized.

Referring to 1 and FIG. 9, the present disclosure provides a mobile terminal. The mobile terminal includes a host 20 and the camera module 10 as described above. The camera module 10 and the host 20 may operate cooperatively. When the camera module 10 is installed on the host 20, the host 20 may control the shooting function of the camera module 10 through a wired connection. When the camera module 10 is detached from the host 20, the host 20 may control the shooting function of the camera module 10 through a wireless connection. The camera module 10 does not occupy the installation space of the display 21 on the host 20. In the case that the shooting function is performed and the overall size of the host 20 is constant, the area of the display 21 could be increased. In such a way, the ratio of the area of the display 21 to the area of the host 20 could be increased. That is, the screen ratio of the host 20 could be increased, such that the screen ratio of the entire mobile terminal could be increased.

The technical features of the embodiments described above may be arbitrarily combined. In order to simplify the description, all possible combinations of the technical features in the above embodiments have not been described. However, as long as there is no contradiction in the combination of these technical features, the combination should be considered as the scope described in this specification.

The above description is for the purpose of illustrating implementations of the present disclosure, but not to limit the scope of the present disclosure. Any equivalent structural or process transformation performed based on the drawings and the specification of the present disclosure, applied directly and indirectly in other related art, should be within the scope of the present disclosure. The protection scope of the present disclosure shall be subject to the appended claims.

What is claimed is:

1. A camera module, capable of being detachably arranged on a host of a mobile terminal, comprising:
a main board, defining a first mounting hole;
a battery stacked on the main board and defining a second mounting hole corresponding to the first mounting hole;
a capturing assembly comprising a bracket and a camera, wherein the camera is installed on the bracket, the bracket is contained in a space defined by both the first mounting hole and second mounting hole, the camera is disposed through the first mounting hole, and a light incident surface of the camera is exposed out of the first mounting hole; and
a housing sleeved on the main board and the battery.

2. The camera module as claimed in claim 1, wherein the main board has a connecting surface arranged opposite to the battery, a first board to board (BTB) connector is arranged on the connecting surface; the capturing assembly further comprises a first flexible printed circuit (FPC) board arranged on the bracket and connected to the camera, the first FPC board has a mounting end, a part of the first FPC board is stacked between the main board and the battery, the mounting end is bent to the connecting surface, and a first BTB socket capable of being paired with the first BTB connector is arranged on the mounting end.

3. The camera module as claimed in claim 2, wherein a part of the connecting surface is recessed toward the battery to form a sink, and the first BTB connector is arranged on a bottom wall of the sink.

4. The camera module as claimed in claim 2, further comprising an antenna spring sheet, the antenna spring sheet being arranged on the connecting surface.

5. The camera module as claimed in claim 1, wherein the main board has a contacting surface arranged toward the battery, a second BTB connector is arranged on the contacting surface, a second FPC board is connected to the battery, a second BTB socket is arranged on the second FPC board, and the second BTB socket is capable of being paired with the second BTB connector.

6. The camera module as claimed in claim 1, wherein a surface of the housing defines a third mounting hole configured for the camera to be disposed through, and a distance between the light incident surface of the camera and the surface of the housing is A, where 0 mm≤A≤5 mm.

7. The camera module as claimed in claim 1, further comprising a connecting plug configured to transmit current and data, the connecting plug being connected to the main board and capable of being inserted in the host.

8. The camera module as claimed in claim 7, wherein the connecting plug is rotatably connected to the main board, a clearance gap is defined on the housing, the connecting plug is arranged passing through the clearance gap, and the clearance gap provides a rotation space for the connecting plug.

9. The camera module as claimed in claim 1, wherein the battery has a stacking surface stacked on the main board, and the second mounting hole is defined on the stacking surface; the light incident surface of the camera is arranged on a same side where the stacking surface is arranged.

10. The camera module as claimed in claim 1, wherein a contour of the battery has a rectangular shape, and a contour of the second mounting hole has a rectangular shape; a circumferential direction of the second mounting hole is closed; the contour of the second mounting hole is contained in the contour of the battery.

11. The camera module as claimed in claim 1, wherein a notch communicating with the second mounting hole is defined on the battery along a circumference of the second mounting hole.

12. The camera module as claimed in claim 1, wherein the main board has a connecting surface arranged opposite to the battery, a first board to board (BTB) connector is arranged on the connecting surface; the capturing assembly further includes a first flexible printed circuit (FPC) board arranged on the bracket and connected to the camera, the first FPC board has a mounting end, a part of the first FPC board is stacked on a surface of the battery away from the main board, the mounting end is bent to the connecting surface, and a first BTB socket capable of being paired with the first BTB connector is arranged on the mounting end.

13. A camera module, comprising:
a main board comprising a contacting surface and a connecting surface arranged opposite to the contacting surface, wherein the main board defines a first mounting hole penetrating the contacting surface and the connecting surface;
a battery stacked on the contacting surface and defining a second mounting hole communicating with the first mounting hole;
a capturing assembly comprising a camera, wherein a part of the capturing assembly is disposed through the first mounting hole and second mounting hole, and an ambient light on a side of the connecting surface is capable of entering into the camera; and
a housing sleeved on the main board and the battery.

14. The camera module as claimed in claim 13, wherein the capturing assembly comprises a bracket, the camera is arranged on the bracket, and the bracket is arranged passing through the first mounting hole and the second mounting hole.

15. The camera module as claimed in claim 14, wherein the capturing assembly comprises a first flexible printed circuit (FPC) board arranged on the bracket and connected to the camera, the first FPC board is bent from a side where the battery is arranged to a side where the connecting surface is arranged, one of the side where the connecting surface of the main board is arranged and an end of the first FPC board away from the camera is arranged with a first board to board (BTB) connector, the other one of the side where the connecting surface of the main board is arranged and an end of the first FPC board away from the camera is arranged with a first BTB socket, and the first BTB socket is capable of being paired with the BTB connector.

16. The camera module as claimed in claim 15, wherein the battery comprises a stacking surface stacked on the main board; a part of the contacting surface is recessed along a direction away from the battery or a part of the stacking surface is recessed along a direction away from the main board to form a recess, and a part of the first FPC board is received in the recess.

17. The camera module as claimed in claim 15, wherein a sink passing through a margin of the connecting surface is defined on the connecting surface, the first BTB connector and the first BTB socket paired to each other are received in the sink.

18. The camera module as claimed in claim 13, wherein a second FPC board is connected to the battery; one of an end of the second FPC board away from the battery and the main board is arranged with a second BTB connector; the other one of the end of the second FPC board away from the battery and the main board is arranged with a second BTB socket; the second BTB socket is capable of being paired with the second BTB connector.

19. The camera module as claimed in claim 13, wherein a surface of the housing defines a third mounting hole configured for the camera to be disposed through, a side of the camera for the light entering is protruded from the housing, or the side of the camera for the light entering is flush with the surface of the housing.

20. A mobile terminal, comprising a host and a camera module, wherein the camera module is capable of being installed on and detached from the host, and wirelessly connected with the host after being detached; the camera module comprises:
a main board comprising a contacting surface and a connecting surface arranged opposite to the contacting surface, wherein a first mounting hole penetrating the contacting surface and the connecting surface is defined on the main board;
a battery stacked on the contacting surface and defining a second mounting hole communicating with the first mounting hole;
a capturing assembly comprising a camera, wherein a part of the capturing assembly is disposed through the first mounting hole and second mounting hole, and an ambient light on a side of the connecting surface is capable of entering into the camera; and
a housing sleeved on the main board and the battery.

* * * * *